US012659726B2

(12) United States Patent
Mittal et al.

(10) Patent No.: US 12,659,726 B2
(45) Date of Patent: Jun. 16, 2026

(54) METHOD AND SYSTEM FOR CONTROLLING SA CAPABILITY OF UE

(71) Applicant: SAMSUNG ELECTRONICS CO., LTD., Suwon-si (KR)

(72) Inventors: Mayank Mittal, Bangalore (IN); Arijit Sen, Bangalore (IN); Pratibha Kattemane Satyaganapati, Bangalore (IN); Subhrodip Mazumdar, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 296 days.

(21) Appl. No.: 18/519,880

(22) Filed: Nov. 27, 2023

(65) Prior Publication Data

US 2024/0196199 A1 Jun. 13, 2024

Related U.S. Application Data

(63) Continuation of application No. PCT/KR2023/012866, filed on Aug. 30, 2023.

(30) Foreign Application Priority Data

Dec. 13, 2022 (IN) ............................. 202241071980
Mar. 1, 2023 (IN) ............................. 202241071980

(51) Int. Cl.
*H04W 8/24* (2009.01)
*H04W 8/20* (2009.01)

(52) U.S. Cl.
CPC ............. *H04W 8/24* (2013.01); *H04W 8/205* (2013.01)

(58) Field of Classification Search
CPC ....... H04W 8/24; H04W 8/205; H04W 8/183; H04W 8/22
See application file for complete search history.

(56) References Cited

U.S. PATENT DOCUMENTS

| | | | |
|---|---|---|---|
| 10,959,085 B2 | 3/2021 | Chikkala et al. | |
| 11,039,502 B1 * | 6/2021 | Huang ................... | H04W 60/00 |
| 11,369,003 B2 | 6/2022 | Singh et al. | |

(Continued)

FOREIGN PATENT DOCUMENTS

WO WO-2020092542 A1 * 5/2020 .......... H04W 12/041

OTHER PUBLICATIONS

Oppo, "5G ProSe configuration related services and files," 3GPP TSG-CT WG6 Meeting #110e, E-Meeting, C6-220184, Feb. 22-25, 2022, Total 52 pages.

(Continued)

*Primary Examiner* — Siu M Lee
(74) *Attorney, Agent, or Firm* — Sughrue Mion, PLLC

(57) ABSTRACT

The disclosure relates to a 5G or 6G communication system for supporting a higher data transmission rate. A method for controlling standalone access (SA) capability performed by a terminal, includes: detecting that at least one subscriber identity module (SIM) card is available in the terminal; determining whether the at least one SIM card supports SA capability available in the terminal; enabling the SA capability in the terminal based on determining that the at least one SIM card supports the SA capability; and disabling the SA capability in the terminal based on determining that the at least one SIM card does not support the SA capability.

20 Claims, 7 Drawing Sheets

(56) References Cited

U.S. PATENT DOCUMENTS

| 2017/0019780 A1 | 1/2017 | Hsu |
| 2017/0048855 A1 | 2/2017 | Garg et al. |
| 2020/0314731 A1* | 10/2020 | Ryu ..................... H04W 48/08 |
| 2021/0392570 A1 | 12/2021 | Leduc et al. |
| 2021/0409934 A1* | 12/2021 | Tiwari ................... H04W 8/24 |
| 2022/0217526 A1* | 7/2022 | Zheng .................. H04W 8/183 |
| 2022/0386104 A1* | 12/2022 | Chaugule .............. H04W 60/04 |
| 2023/0164727 A1* | 5/2023 | Wei ......................... H04W 4/14 |
| | | 455/435.1 |
| 2023/0292109 A1* | 9/2023 | Chuang .................. H04W 8/26 |
| 2025/0142326 A1* | 5/2025 | Wang ................. H04W 12/062 |

OTHER PUBLICATIONS

Thales DIS, "Test Cases to cover USIM with non-IMSI SUPI Type," 3GPP TSG-CT WG6 Meeting #111e, E-Meeting, C6-220298, May 17-20, 2022, Total 20 pages.

China Mobile, "Adding eDRX parameters in the USIM for NG-RAN," 3GPP TSG-CT WG6 #110-e, E-meeting, C6-220181, Feb. 22-25, 2022; Total 11 pages.

Search Report issued on Dec. 4, 2023 by International Searching Authority in International Application No. PCT/KR2023/012866.

* cited by examiner

UE powers up 5G SA device on SIM detection, and initially camps on LTE network — 310

UE moved to SA area — 320

UE camped on SA network using mapped GUTI — 330

METHOD AND SYSTEM FOR CONTROLLING SA CAPABILITY OF UE

CROSS REFERENCE TO RELATED APPLICATIONS

This application is a continuation of International Application No. PCT/KR2023/012866 designating the United States, filed on Aug. 30, 2023, which is based on and claims priority to Indian Provisional Application Number 202241071980 filed on Dec. 13, 2022, and Indian Non-Provisional Application Number 202241071980 filed on Mar. 1, 2023, in the Indian Patent Office, the disclosures of which are incorporated by reference herein in their entireties.

FIELD OF INVENTION

The present disclosure relates to wireless communication, and more particularly to a method and a system for controlling standalone access (SA) capability of a User Equipment (UE).

BACKGROUND 5G mobile communication technologies define broad frequency bands such that high transmission rates and new services are possible, and can be implemented not only in "Sub 6 GHz" bands such as 3.5 GHZ, but also in "Above 6 GHZ" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/ service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

In general, fifth generation standalone access (5G SA) describes standalone operation of a 5G network. During standalone operation, the 5G network is not reliant on any other network infrastructure and can operate independently. In recent times, many operators started 5G SA commercialization. In few scenarios, a user equipment (UE) supports 5G SA but a SIM card fails to support the 5G SA. Thereby leading to unnecessary Radio Access Technology (RAT) scans for the SA when the SIM card fails to support the 5G SA capability, and increasing the time required for initial registration with a network. In few other scenarios, the UE chipset supports the 5G SA, but the SA capability is disabled in software since no network supports the SA capability in a particular region. In such cases, the UE may need to go through Maintenance Release (MR) to enable the SA support. Also, the UE might require a dynamic way to enable/disable the SA capability based on the SIM card inserted into the UE. Further additional software upgrade is required to enable the 5G SA capability during MR. In few exceptional cases, while moving the SIM card from fourth-generation (4G) to the 5G SA network, the SIM card is not SA capable, but the UE uses a mapped 5G Global Unique Temporary Identifier (GUTI) to camp on a SA network. However, the UE may be allowed by the network to register on the 5G SA network without having a valid SIM card to be authenticated over the SA network.

In related art methods and systems, most commercial network operators reject a registration request from a UE which does not send a Subscription concealed identifier (SUCI) (a key identifier used in the 5G SA). This is in contrast to LTE, in which an international mobile subscriber identity (IMSI) sent in the clear is acceptable during the initial registration. Therefore, it is required to control the UE access to the SA network based on the SIM card's capability. A SUCI is a version of a SUPI that is protected with asymmetric cryptography. A SUPI is a generic name of an international mobile subscriber identity (IMSI) in 5G networks.

Thus, it is desired to address the above mentioned disadvantages or other shortcomings or at least provide a useful alternative.

OBJECT OF INVENTION

Embodiments provide a method and a system for controlling standalone access (SA) capability of a User Equipment (UE). The method includes determining whether a SIM card supports a subscription identifier privacy support service (Service no 124) and/or a subscription concealed identifier (SUCI) calculation service (Service no 125) by a Universal Subscriber Identity Module (USIM), when the SIM card is detected. Therefore, the proposed method does not require additional software upgrade to enable the 5G SA capability in the UE as the SIM card's capability is determined.

Another object of the embodiments herein is to dynamically enable/disable SA based on the SIM card services. The proposed method avoids unauthorized access to operator's 5G SA network using a mapped Global Unique Temporary Identifier (GUTI) from a fourth-generation(4G)/Long term evolution (LTE) system. The proposed method avoids unnecessary Radio Access Technology (RAT) scans for the SA when the SIM card cannot support 5G SA services, thereby reducing the time required for initial registration with the network and saving battery life especially for no service scenarios or roaming scenarios where 5G SA network/subscription might not be available.

According to an aspect of the disclosure, a method for controlling standalone access (SA) capability performed by a terminal, includes: detecting that at least one subscriber identity module (SIM) card is available in the terminal; determining whether the at least one SIM card supports SA capability available in the terminal: enabling the SA capability in the terminal based on determining that the at least one SIM card supports the SA capability: and disabling the SA capability in the terminal based on determining that the at least one SIM card does not support the SA capability.

The determining whether the at least one SIM card supports the SA capability may include: based on the at least one SIM card being detected, determining whether the at least one SIM card supports at least one of a subscription identifier privacy support service and a subscription concealed identifier (SUCI) calculation service performed by a universal subscriber identity module (USIM): based on determining that the at least one SIM card supports at least one of the subscription identifier privacy support service and the SUCI calculation service: determining SA support for the terminal, and enabling the SA capability in the terminal; and based on determining that the at least one SIM card does not support at least one of the subscription identifier privacy support service and the SUCI calculation service, disabling the SA capability in the terminal.

The method may further include, based on a capability of the at least one SIM card changing: enabling the SA capability in the terminal based on the capability of the at least one SIM card changing to support at least one of the subscription identifier privacy support service and the SUCI calculation service: and disabling the SA capability in the terminal based on the capability of the at least one SIM card changing to not support at least one of the subscription identifier privacy support service and the SUCI calculation service.

The enabling the SA capability may include: adding the SA capability to a radio access technology (RAT) priority list, wherein the terminal is configured to prioritize an SA RAT over a plurality of RATs: and moving the terminal to an SA network using a mapped global unique temporary identifier (GUTI) or a SUCI.

The disabling the SA capability in the terminal may include: blocking the SA capability in the terminal: removing the SA capability from a radio access technology (RAT) priority list: and scanning for an alternate RAT among a plurality of RATs and camp on the alternate RAT until the at least one SIM card supports at least one of the subscription identifier privacy support service and the SUCI calculation service.

The method may further include, after the scanning for the alternate RAT over the plurality of RATs and the camping on the alternate RAT: acquiring a network by the terminal on the alternate RAT: and updating the at least one SIM card in response to the network on the alternate RAT using a SIM over-the-air (OTA) procedure to enable the SA capability in the terminal.

The method may further include: determining an NULL SUCI is allowed in a public land mobile network (PLMN) as per data maintained by the terminal, wherein the PLMN is a current PLMN: enabling the SA capability in the terminal based on the NULL SUCI being allowed in the current PLMN as per the data maintained by the terminal; determining whether SA registration with the NULL SUCI is successful in the terminal; based on determining that the SA registration with the NULL SUCI is successful, adding SA registration with the NULL SUCI to an allowed list of the PLMN to enable the SA capability with the NULL SUCI in a database maintained by the terminal; and based on determining that the SA registration with the NULL SUCI is unsuccessful, starting a predefined timer at a configurable interval in the terminal to enable SA registration with the NULL SUCI in the terminal.

According to an aspect of the disclosure a terminal includes: a memory: a communicator; a processor operatively coupled to the memory and the communicator; and a standalone access (SA) capability management controller operatively coupled to the memory, the processor and the communicator, the SA capability management controller configured to: detect whether at least one subscriber identity module (SIM) card is available in the terminal; determine whether the at least one SIM card supports a standalone access (SA) capability available in the terminal: enable the SA capability in the terminal based on determining that the at least one SIM card supports the SA capability: and disable the SA capability in the terminal based on determining that the at least one SIM card does not support the SA capability.

The SA capability management controller may be further configured to determine the SA capability by: based on the at least one SIM card being detected, determining whether the at least one SIM card supports at least one of a subscription identifier privacy support service and a subscription concealed identifier (SUCI) calculation service performed by a universal subscriber identity module (USIM): based on determining that the at least one SIM card supports at least one of the subscription identifier privacy support service and the SUCI calculation service, determining SA support for the terminal, and enabling the SA capability in the terminal; and based on the at least one SIM card not supporting at least one of the subscription identifier privacy support service or the SUCI calculation service, disabling the SA capability in the terminal.

The SA capability management controller may be further configured to, based on a capability of the at least one SIM card changing: enable the SA capability in the terminal based on the capability of the at least one SIM card changing to support at least of the subscription identifier privacy support service and the SUCI calculation service; and disable the SA capability in the terminal based on the capability of the at least one SIM card changing to not support at least one of the subscription identifier privacy support service and the SUCI calculation service.

The SA capability management controller may be further configured to enable the SA capability by: adding the SA capability to a radio access technology (RAT) priority list, wherein the terminal is configured to prioritize an SA RAT over a plurality of RATs; and moving the terminal to an SA network using the GUTI or a SUCI.

The SA capability management controller may be further configured to disable the SA capability in the terminal by: blocking the SA capability in the terminal; removing the SA capability from a radio access technology (RAT) priority list; and wherein the terminal may be further configured to: scan for an alternate RAT over a plurality of RATs, and camp on the alternate RAT until the at least one SIM card supports at least one of the subscription identifier privacy support service and the SUCI calculation service.

The terminal may be further configured to, after scanning for the alternate RAT over the plurality of RATs and camping on the alternate RAT: acquire a network on the alternate RAT: and update the at least one SIM card with respect to the network on the alternate RAT using a SIM over-the-air (OTA) procedure to enable the SA capability in the terminal.

The terminal may be further configured to: determine that a NULL SUCI is allowed in a public land mobile network (PLMN) based on data maintained by the terminal, wherein the PLMN is a current PLMN; enable the SA capability in the terminal based on the NULL SUCI being allowed in the PLMN based on the data maintained by the terminal; determine whether SA registration with the NULL SUCI is successful in the terminal; based on determining that the SA registration with NULL SUCI is successful, add SA registration with the NULL SUCI to an allowed list of PLMNs to enable the SA capability with the NULL SUCI in a database maintained by the terminal; and based on determining that the SA registration with NULL SUCI is unsuccessful, start a predefined timer at a configurable interval in the terminal to enable SA registration with the NULL SUCI in the terminal.

These and other aspects of the embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the embodiments herein without departing from the spirit of the disclosure, and the embodiments herein include all such modifications.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION OF INVENTION

Figure 1:
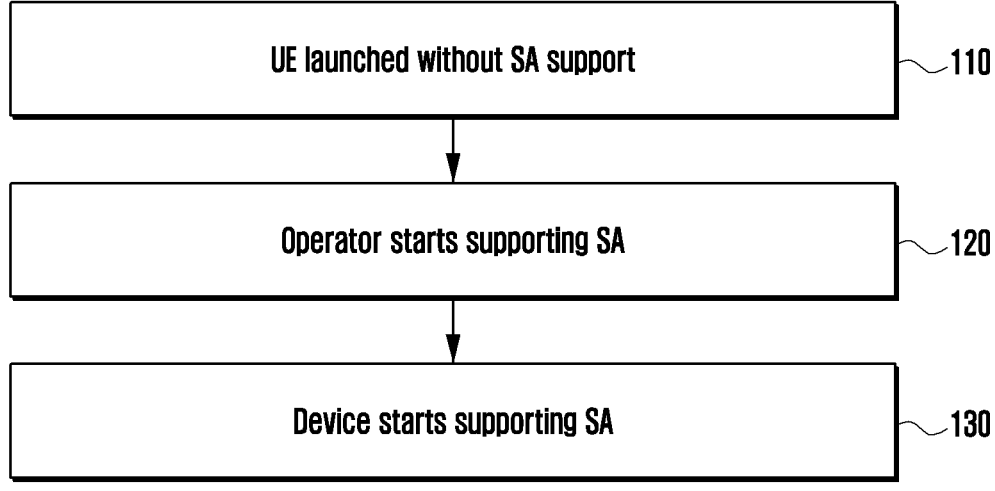
FIG. 1 is an example illustrating a process of SA support using maintenance release (MR)

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a nonexclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another. As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Accordingly the embodiments herein disclose a method for controlling standalone access (SA) capability of a terminal. The method includes detecting whether a SIM card is available in terminal. The method includes determining SA capability of the SIM card available in the terminal. Further, the method includes enabling the SA capability in the terminal if the SIM card supports the SA capability, and disabling the SA capability in the terminal (400) if the SIM card fails to support the SA capability.

Further, the SA capability of the SIM card available in the terminal is determined by determining whether the SIM card supports at least one of a subscription identifier privacy support service (Service no 124) and a subscription concealed identifier (SUCI) calculation service (Service no 125) by a Universal Subscriber Identity Module (USIM), when the SIM card is detected. The method includes performing one of (i) determining SA support for the UE when the SIM card supports at least one of the subscription identifier privacy support service and the SUCI calculation service by the USIM, (ii) enabling the SA capability in the terminal in case that the SIM card supports at least one of the subscription identifier privacy support service and the SUCI calculation service by the USIM, and (iii) disabling the SA capability in the terminal in case that the SIM card fails to support at least one of the subscription identifier privacy support service and the SUCI calculation service by the USIM.

Accordingly the embodiments herein disclose a system for controlling SA capability of the terminal. The system includes a memory, a processor coupled to the memory, a communicator coupled to the memory and the processor, and a SA capability management controller coupled to the memory, the processor and the communicator. The SA capability management controller is configured to detect whether the SIM card is available in the terminal, and determine the SA capability of the SIM card available in the terminal. Further, the SA capability management controller is configured to enable the SA capability in the terminal if the SIM card supports the SA capability, and disable the SA capability in the UE if the SIM card fails to support the SA capability.

Related art methods and systems provide SA support using a maintenance release (MR) as shown in FIG. 1. Referring to FIG. 1, considering a scenario where a UE device chipset supports 5G SA, but disables SA in software because of unpreparedness of network's SA support in some particular regions. In such cases, UE may need to go through MR to enable the SA support. At step 110, the related art method determines that the UE fails to support the SA capability. At step 120, the method determines that a network operator starts supporting the SA capability. At step 130, MR is additionally used to enable SA support in the UE and the UE starts supporting SA based on the MR. However, the related art method requires additional software upgrade (Maintenance release) to enable 5G SA capability in the UE, which is time consuming and increases cost for upgrading the software.

Figure 2:
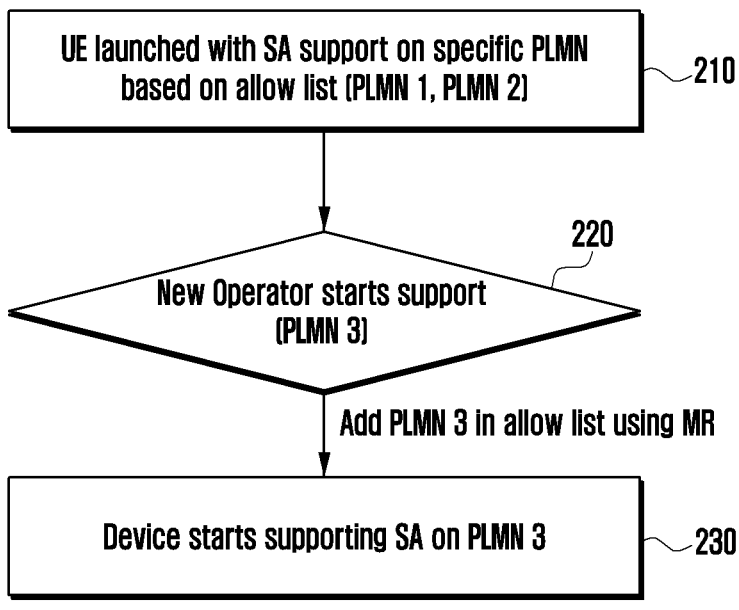
FIG. 2 is an example illustrating a process of SA support using MR-New operator support.

Related art methods and systems provide SA support using MR-New operator support as shown in FIG. 2. Referring to FIG. 2, considering a scenario where the UE chipset supports 5G SA, but the 5G SA is enabled based on a public land mobile network (PLMN) allow list. The UE enables support only for limited operators based on the PLMN allow list. In such cases, the UE may need to go through the MR to enable SA support for specific PLMN (new operator). At step 210, the related art method determines that the UE supports SA on specific PLMN based on an allow list (PLMN1,PLMN2). At step 220, the related art method determines that the UE starts supporting SA on a new operator (PLMN3) by adding the new operator (PLMN3) in the specific allow list using MR. At step 230, the UE starts supporting SA on the new operator (PLMN3). However, using MR to add a new operator (PLMN3) in the specific allow list requires an additional software upgrade to enable the 5G SA capability, which is time consuming and increases cost for upgrading the software.

Figure 3:
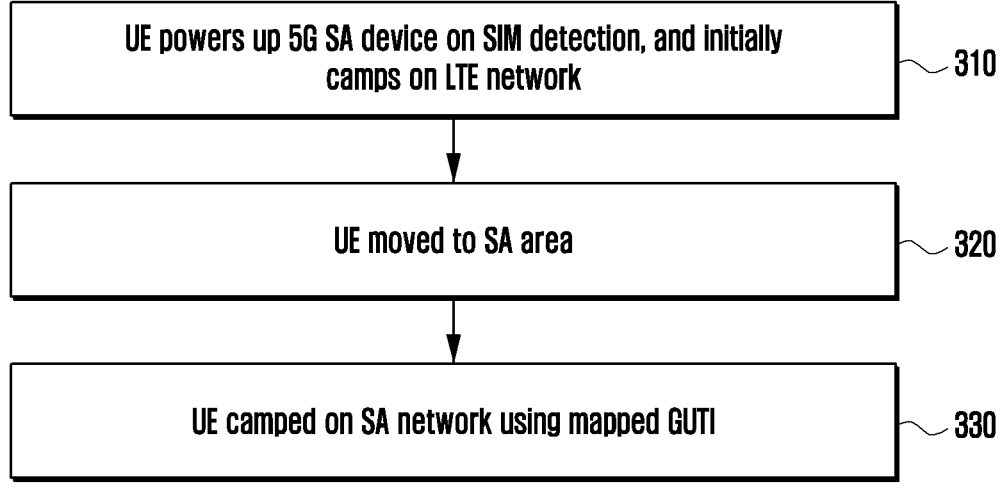
FIG. 3 is an example illustrating a process of SA support using a mapped Global Unique Temporary Identifier (GUTI)

Further, in related art methods and systems, the UE camps on a Fourth-generation Long term evolution (4G LTE) to enable SA in few exceptional cases as shown in FIG. 3. In such cases, the SIM card is not SA capable or SA subscribed, but the UE uses the mapped 5G Global Unique Temporary Identifier (GUTI) to camp on the SA network (while moving from 4G to 5G SA). The mapped GUTI is associated with a unique ID of the UE, and so is referred to as a mapped GUTI. The unique ID of the UE may be a permanent equipment identifier (PEI). Referring to FIG. 3, at step 310, the UE enables 5G SA on SIM detection, and initially camps on the LTE network. At step 320, the UE moves to a 5G SA area. At step 330, the UE tries registration on the SA network using the mapped GUTI and may register successfully even when the SIM card is not capable to support the 5G SA or a user is not subscribed for 5G SA service, resulting in revenue loss for an operator. Additionally, the registration of the UE using the mapped GUTI may lead to registration failure when the SIM card does not support the 5G services or when the SIM card is not upgraded by the operator to support the 5G SA services, causing registration delays on the alternate RATs.

The proposed method solves the above mentioned issues as follows:

i. If the UE is 5G SA capable and the network has requested SA to be enabled at an initial launch, then the software will have 5G SA enabled by default.

ii. When a new SIM card is inserted or SIM swap happens, the UE requests for the availability of the services (Subscription identifier privacy support service or SUCI calculation service by the USIM) in the SIM.

iii. If the SIM card supports any of the Subscription identifier privacy support service or SUCI calculation service by the USIM, then the UE enables the SA capability.

iv. If the SIM card fails to support any of the Subscription identifier privacy support service or SUCI calculation service by the USIM, then the UE disables the SA capabilities before registration on the network.

v. Alternatively, if the SA services supported SIM is inserted in a SA disabled UE, then after reading the SIM services, the UE re-enables the SA capabilities before registration on the network.

Unlike the related art methods and systems, the proposed method enables/disables the 5G SA capability in the UE in a cost effective manner. The proposed method uses a dynamic UE SIM differentiation solution to efficiently manage the 5G SA capabilities of the UE, thereby avoiding unnecessary over-the-air (OTA) signaling between the UE and the Network. Further, unnecessary Radio Access Technology (RAT) scans for the SA when the SIM card fails to support the 5G SA services can be avoided. Thereby, reducing the time required for initial registration with the network and saving battery life. Also, the additional software upgrade to enable the 5G SA capability can be avoided as the proposed method determines the 5G SA capability by the SIM card's capability.

Referring now to the drawings and more particularly to FIGS. 4 through 7, where similar reference characters denote corresponding features consistently throughout the figure, these are shown as example embodiments.

Figure 4:
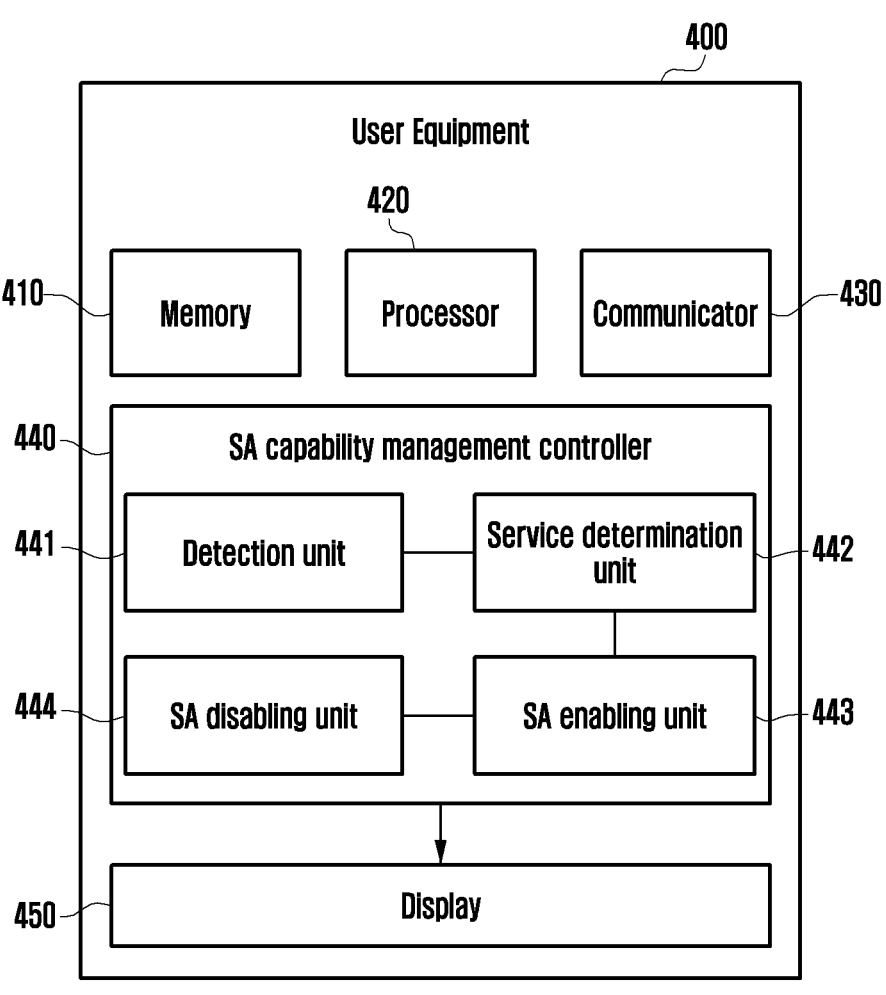
FIG. 4 is a block diagram of a User Equipment (UE) for controlling standalone access (SA) capability, according to one or more embodiments.

FIG. 4 is a block diagram of the UE (400) for controlling SA capability based on the SIM subscription, according to one or more embodiments.

Referring to the FIG. 1, the UE (400) may be but not limited to a terminal, a laptop, a palmtop, a desktop, a mobile phone, a smart phone, Personal Digital Assistant (PDA), a tablet, a wearable device, an Internet of Things (IOT) device, a virtual reality device, a foldable device, a flexible device, a display device, and an immersive system.

In an embodiment, the UE (400) includes a memory (410), a processor (420), a communicator (430), a SA capability management controller (440), and a display (450).

The memory (410) is configured to store subscription identifier privacy support service by a Universal Subscriber Identity Module (USIM) and a subscription concealed identifier (SUCI) calculation service by the USIM. The memory (410) can include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (410) may, in some examples, be considered a non-transitory storage medium. The term "non-transitory" may indicate that the storage medium is not embodied in a carrier wave or a propagated signal. However, the term "non-transitory" should not be interpreted that the memory (410) is non-movable. In some examples, the memory (410) is configured to store larger amounts of information. In certain examples, a non-transitory storage medium may store data that can, over time, change (e.g., in Random Access Memory (RAM) or cache).

The processor (420) may include one or a plurality of processors. The one or the plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The processor (420) may include multiple cores and is configured to process the subscription identifier privacy support service and the SUCI calculation service by the USIM stored in the memory (410).

In an embodiment, the communicator (430) includes an electronic circuit specific to a standard that enables wired or wireless communication. The communicator (430) is configured to communicate internally between the memory (410), the processor (420), and the SA capability management controller (440) of the UE (400) and with external devices via one or more networks.

In an embodiment, the SA capability management controller (440) includes a detection unit (441), a service determination unit (442), a SA enabling unit (443), and a SA disabling unit (444). As mentioned below, each unit may be implemented by a processor and memory and/or custom hardware such as an application specific integrated circuit (ASIC).

In an embodiment, the detection unit (441) is configured to detect whether the SIM card is available or not available in the UE (400).

In an embodiment, the service determination unit (442) is configured to determine whether the SIM card supports one of the subscription identifier privacy support service and the SUCI calculation service by the USIM, when the detection unit (441) detects that the SIM card is available in the UE (400).

In an embodiment, the SA enabling unit (443) is configured to determine SA support for the UE (400) when the service determination unit (442) determines that the SIM card supports at least one of the subscription identifier privacy support service and the SUCI calculation service by the USIM. The SA enabling unit (443) is configured to enable the SA capability in the UE (400) in response to determining SA support for the UE (400) when the SIM card supports one of the subscription identifier privacy support service and the SUCI calculation service by the USIM.

In an embodiment, the SA disabling unit (444) is configured to disable the SA capability in the UE (400) when the service determination unit (442) determines that the SIM card fails to support at least one of the subscription identifier privacy support service and the SUCI calculation service by the USIM.

The SA capability management controller (440) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

At least one of the plurality of modules/components of the SA capability management controller (440) may be implemented through an AI model. A function associated with the AI model may be performed through memory (410) and the processor (420). The one or a plurality of processors controls the processing of the input data in accordance with a predefined operating rule or the AI model stored in the non-volatile memory and the volatile memory. The predefined operating rule or artificial intelligence model is provided through training or learning.

Here, being provided through learning means that, by applying a learning process to a plurality of learning data, a predefined operating rule or AI model of a desired characteristic is made. The learning may be performed in a device itself in which AI according to an embodiment is performed, and/or may be implemented through a separate server/system.

The AI model may consist of a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning process is a method for training a predetermined target device (for example, a robot) using a plurality of learning data to cause, allow, or control the target device to make a determination or prediction. Examples of learning processes include, but are not limited to, supervised learning, unsupervised learning, semi-supervised learning, or reinforcement learning.

In an embodiment, the display (450) is configured to display one of the subscription identifier privacy support service and the SUCI calculation service by the USIM supported by the UE (400). The display (450) is implemented using touch sensitive technology and comprises one of liquid crystal display (LCD), light emitting diode (LED), etc.

Although the FIG. 4 shows the hardware elements of the UE (400) but it is to be understood that other embodiments are not limited thereon. In other embodiments, the UE (400) may include less or more number of elements. Further, the labels or names of the elements are used only for illustrative purpose and does not limit the scope of the disclosure. One or more components can be combined together to perform same or substantially similar function.

Figure 5:
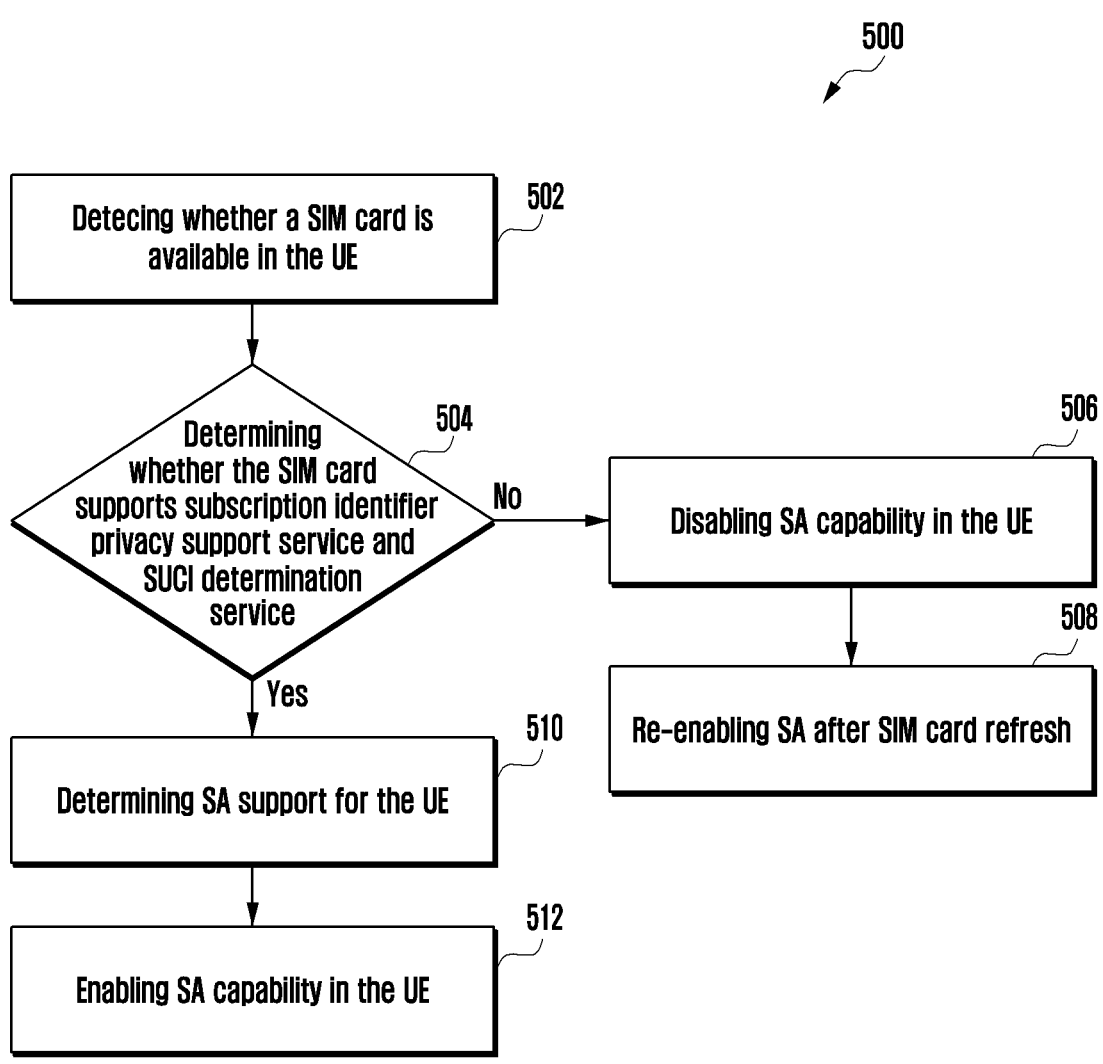
FIG. 5 is a flow chart illustrating a method for controlling the SA capability of the UE, according to one or more embodiments.

FIG. 5 is a flow chart (200) illustrating a method for controlling the SA capability of the UE (400), according to one or more embodiments.

Referring to the FIG. 5, at step 502, the method includes the UE (400) detecting whether the SIM card is available in the UE (400). For example, in the UE (400) as illustrated in the FIG. 1, the SA capability management controller (440) is configured to detect whether the SIM card is available in the UE (400).

At step 504, the method includes the UE (400) determining whether the SIM card supports one of the subscription identifier privacy support service and the SUCI calculation service by the USIM, when the SIM card is detected. For example, in the UE (400) as illustrated in the FIG. 1, the SA capability management controller (440) is configured to determine whether the SIM card supports one of the subscription identifier privacy support service and the SUCI calculation service by the USIM, when the SIM card is detected.

At step 506, the method includes the UE (400) disabling the SA capability in the UE (400) when the SIM card fails to support one of the subscription identifier privacy support service and the SUCI calculation service by the USIM. For example, in the UE (400) as illustrated in the FIG. 1, the SA capability management controller (440) is configured to disable the SA capability in the UE (400) when the SIM card fails to support one of the subscription identifier privacy support service and the SUCI calculation service by the USIM.

At step 508, the method includes the UE (400) providing the SA services via SIM Over-The-Air (OTA) procedure. The SIM OTA procedure updates and changes data in the SIM card without having to reissue the SIM card. The method includes the UE (400) re-enabling the SA capability after SIM refresh as the SA services are available in the SIM card after SIM OTA update. For example, in the UE (400) as illustrated in the FIG. 1, the SA capability management controller (440) is configured to provide the SA services via the SIM OTA procedure. The SIM OTA procedure updates and changes data in the SIM card without having to reissue the SIM card. The SA capability management controller (440) is configured to re-enable the SA capability after SIM refresh as the SA services are available in the SIM card after SIM OTA update.

At step 510, the method includes the UE (400) determining SA support for the UE (400) when the SIM card supports one of the subscription identifier privacy support service and the SUCI calculation service by the USIM. For example, in the UE (400) as illustrated in the FIG. 1, the SA capability management controller (440) is configured to determine SA support for the UE (400) when the SIM card supports one of the subscription identifier privacy support service and the SUCI calculation service by the USIM.

At step 512, the method includes the UE (400) enabling SA capability in the UE, when the SIM card supports one of the subscription identifier privacy support service and the SUCI calculation service by the USIM. For example, in the UE (400) as illustrated in the FIG. 1, the SA capability management controller (440) is configured to enable SA capability in the UE, when the SIM card supports one of the subscription identifier privacy support service and the SUCI calculation service by the USIM.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the disclosure.

Figure 6:
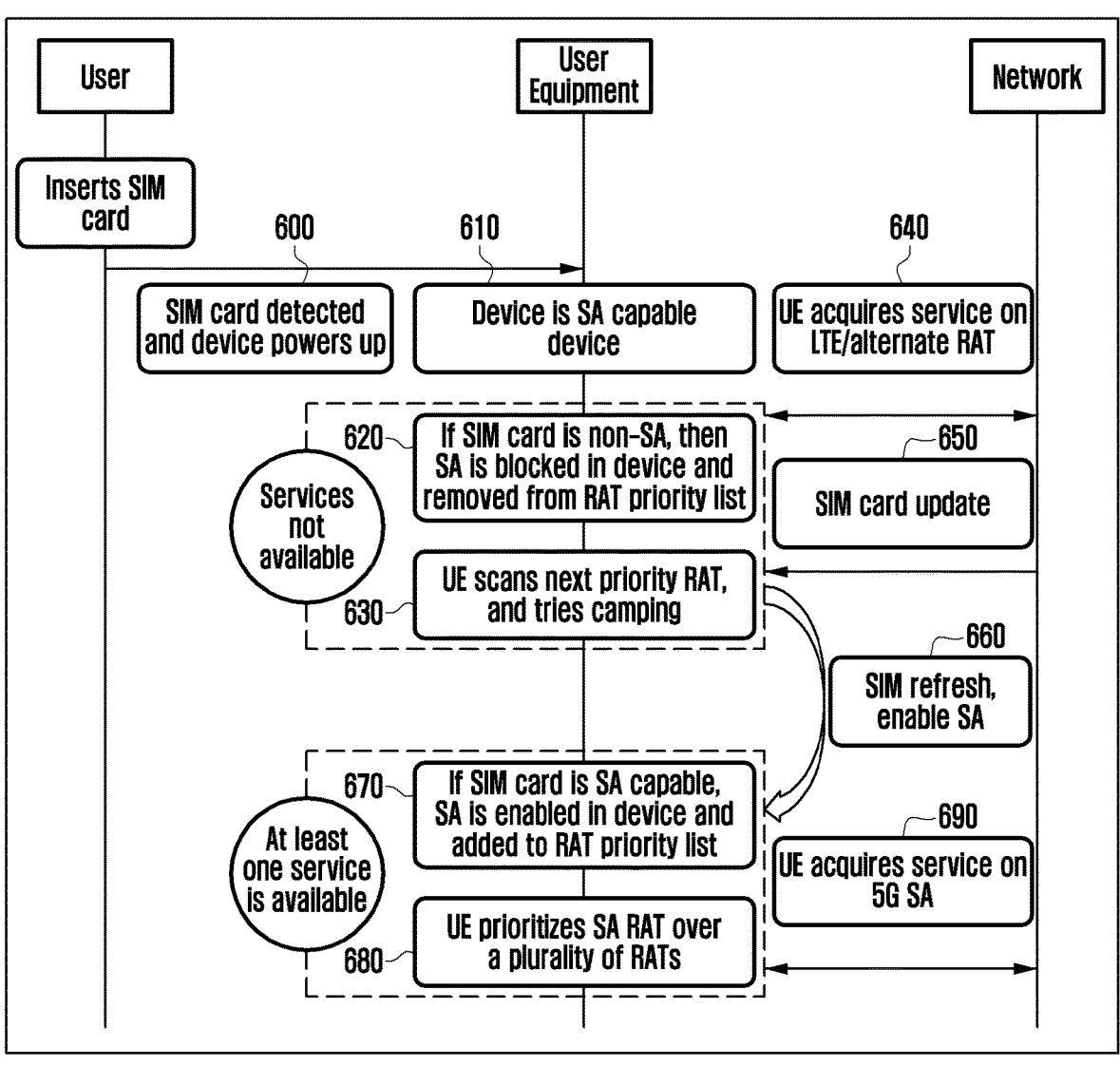
FIG. 6 is a step-by-step procedure illustrating a method for controlling the SA capability based on the SIM subscription, according to one or more embodiments.

FIG. 6 is a step-by-step procedure illustrating a method for controlling the SA capability based on the SIM subscription, according to one or more embodiments.

Referring to FIG. 6, at step 600, the method includes detecting that the SIM card is available in the UE (400). The UE (400) is powered up once the SIM card is detected in the UE (400).

At step 610, the method includes determining that the UE (400) is a SA capable device in response to detecting the SIM card in the UE (400) and powering up the UE (400).

At step 620, the method includes determining whether the SIM card supports one of the subscription identifier privacy support service and the SUCI calculation service by the USIM, when the SIM card is detected. When the SIM card fails to support one of the subscription identifier privacy support service and the SUCI calculation service by the USIM, the SA capability is blocked in the UE (400) and the SA capability is removed from a RAT priority list.

At step 630, the UE (400) scans for an alternate RAT over the plurality of RATs and camps on the alternate RAT until the SIM card supports one of the subscription identifier privacy support service and the SUCI calculation service by the USIM.

At step 640, upon scanning for the alternate RAT over the plurality of RATs and camping on the alternate RAT, the UE (400) acquires a network on the alternate RAT.

At step 650, the method includes updating the SIM card in response to the acquired network on the alternate RAT using the SIM OTA procedure to enable the SA capability in the UE (400).

At step 660, the SIM card is updated and refreshed and the SA capability is enabled in the UE (400).

At step 670, when the SIM card supports one of the subscription identifier privacy support service and the SUCI calculation service by the USIM, the method includes adding the SA capability to the RAT priority list to enable the SA capability in the UE (400).

At step 680, the UE (400) prioritizes SA RAT over a plurality of RATs to enable the SA capability in the UE (400), after adding the SA capability to the RAT priority list.

At step 690, the UE (400) acquires the service on the 5G SA based on inserted SIM card, when the SIM card supports one of the subscription identifier privacy support service and the SUCI calculation service by the USIM.

Further to the user equipment interactions with the network shown in FIG. 6, in some embodiments of acquiring service at operation 690, a mapped GUTI is associated with an identifier of the terminal. In some embodiments, an identifier of the terminal is a permanent equipment identifier (PEI) in operation 690. In some embodiments of operation 690, the USIM is an application performed by the SIM card. In some embodiments of operation 690, the SUCI is based on a subscription permanent identifier (SUPI). In some embodiments, the NULL SUCI is based on an unconcealed SUPI (also see FIG. 7 operation 740, discussed below). Some embodiments of operation 690 further include sending, after the enabling the SA capability at operation 670, an encrypted subscription permanent identifier (SUPI) to the network in the form of a subscription concealed identifier (SUCI).

Figure 7:
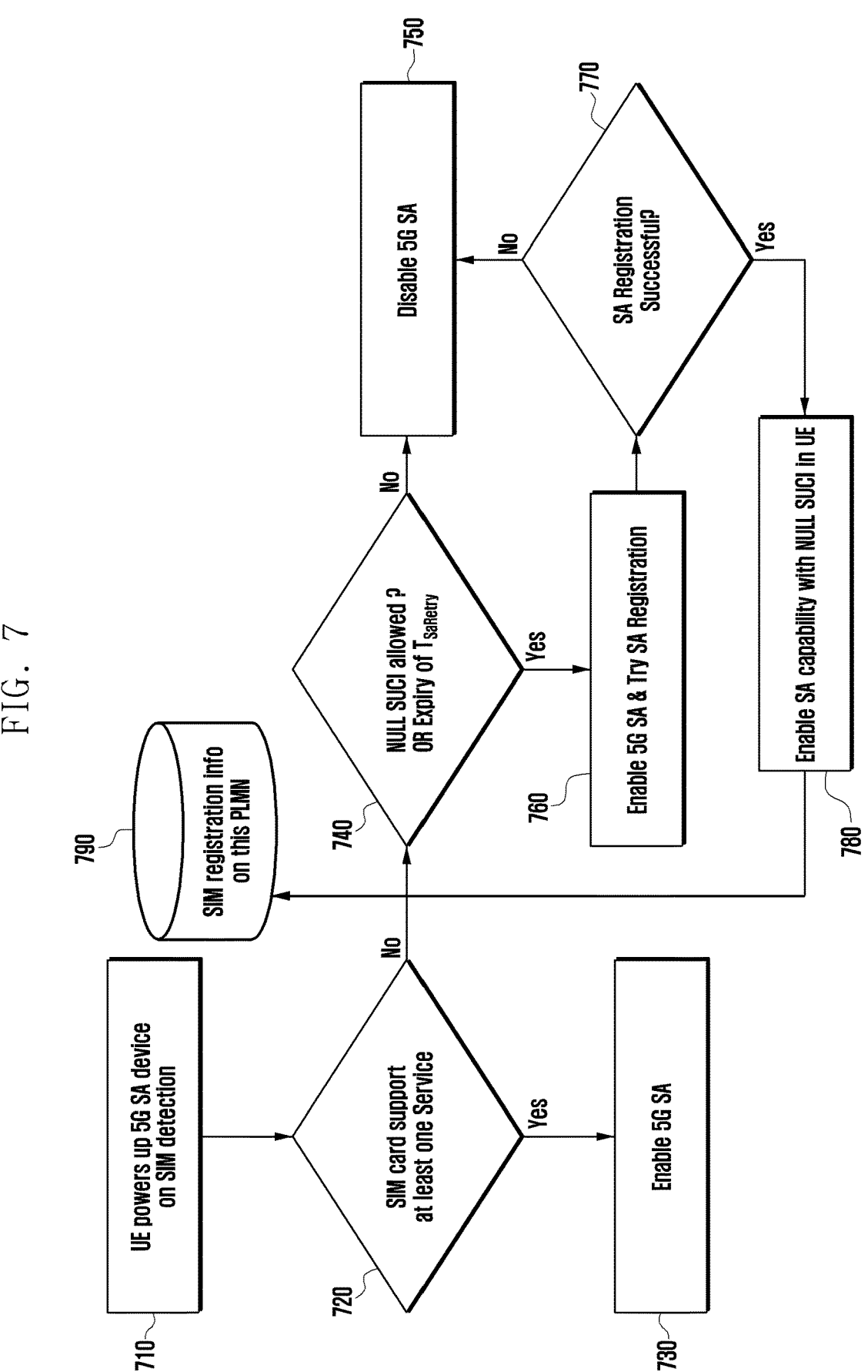
FIG. 7 is a flow diagram illustrating a method for handling exceptional cases when a network allows registration with NULL SUCI, according to one or more embodiments.

FIG. 7 is a flow diagram illustrating a method for handling exceptional cases when a network allows registration with NULL SUCI, according to one or more embodiments.

Referring to FIG. 7, at step 710, the method includes determining that the UE (400) is the SA capable device in response to detecting the SIM card in the UE (400) and powering up the UE (400).

At step 720, the method includes determining whether the SIM card supports one of the subscription identifier privacy support service and the SUCI calculation service by the USIM, when the SIM card is detected.

At step 730, the method includes enabling the SA capability in the UE (400), when the SIM card supports one of the subscription identifier privacy support service and the SUCI calculation service by the USIM.

At step 740, when the SIM card fails to support any of the subscription identifier privacy support service and the SUCI calculation service by the USIM, the method includes determining NULL SUCI is allowed in the current PLMN as per the data maintained by the UE (400). The NULL SUCI is based on an unconcealed SUPI.

At step 750, the method includes disabling the SA capability in the UE (400) when NULL SUCI is not allowed as per the data maintained by UE (400).

At step 760, the method includes enabling the SA capability in the UE (400) when NULL SUCI is allowed in a current Public Land Mobile Network (PLMN) as per the data maintained by the UE (400) and trying SA registration with NULL SUCI in the UE (400).

At step 770, the method includes determining whether the SA registration with NULL SUCI is successful in the UE (400). When SA registration with NULL SUCI is not successful, the SA capability in the UE (400) is disabled and a predefined timer is started at a configurable interval in the UE (400) to enable SA registration with NULL SUCI in the UE (400) for the given PLMN and disable the SA on the PLMN until expiry of the predefined timer.

At step 780, when SA registration with NULL SUCI is successful, the UE (400) adds SA registration with the NULL SUCI to an allowed list of the PLMN to enable the SA capability with NULL SUCI in a database maintained by the UE (400).

At step 790, the SA registration information with NULL SUCI is updated on the PLMN.

In some embodiments of FIG. 7, if a NULL SUCI is allowed, logic flows to operation 760 regardless of the value of a timer (T_SARetry).

Also, in some embodiments of FIG. 7, at operation 770, if the SA registration is not successful and the value of a timer (T_SARetry) is not expired, logic flows to operation 740, otherwise (when the timer has expired), the logic flows to operation 750.

The foregoing description of the specific embodiments will so fully reveal the general nature of the embodiments herein that others can, by applying current knowledge, readily modify and or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of example embodiments, those skilled in the art will recognize that the embodiments herein can be practiced with modification within the scope of the embodiments as described herein.

We claim:

1. A method for controlling standalone access (SA) capability performed by a terminal, the method comprising:

detecting that a subscriber identity module (SIM) card is available in the terminal;

determining whether the SIM card supports a subscription concealed identifier (SUCI) calculation service;

if the SIM card supports the SUCI calculation service, enabling the SA capability in the terminal; and if the SIM card does not support the SUCI calculation service, disabling the SA capability in the terminal.

2. The method of claim 1, further comprising:

based on the SIM card being detected, determining whether the SIM card supports a subscription identifier privacy support service;

based on determining that the SIM card supports the subscription identifier privacy support service:

determining SA support for the terminal, and enabling the SA capability in the terminal; and based on determining that the SIM card does not support the subscription identifier privacy support service, disabling the SA capability in the terminal.

3. The method of claim 2, further comprising, based on a capability of the SIM card changing:

enabling the SA capability in the terminal based on the capability of the SIM card changing to support at least one of the subscription identifier privacy support service and the SUCI calculation service; and disabling the SA capability in the terminal based on the capability of the SIM card changing to not support at least one of the subscription identifier privacy support service and the SUCI calculation service.

4. The method of claim 2, wherein the enabling the SA capability comprises:

adding the SA capability to a radio access technology (RAT) priority list, wherein the terminal is configured to prioritize an SA RAT over a plurality of RATs; and moving the terminal to an SA network using a mapped global unique temporary identifier (GUTI) or a SUCI.

5. The method of claim 2, wherein the disabling the SA capability in the terminal comprises:

blocking the SA capability in the terminal;

removing the SA capability from a radio access technology (RAT) priority list; and scanning for an alternate RAT among a plurality of RATs and camp on the alternate RAT until the SIM card supports at least one of the subscription identifier privacy support service and the SUCI calculation service.

6. The method of claim 5, further comprising, after the scanning for the alternate RAT over the plurality of RATs and the camping on the alternate RAT:

acquiring a network by the terminal on the alternate RAT; and updating the SIM card in response to the network on the alternate RAT using a SIM over-the-air (OTA) procedure to enable the SA capability in the terminal.

7. The method of claim 1, further comprising:

determining an NULL SUCI is allowed in a public land mobile network (PLMN) as per data maintained by the terminal, wherein the PLMN is a current PLMN;

enabling the SA capability in the terminal based on the NULL SUCI being allowed in the current PLMN as per the data maintained by the terminal;

determining whether SA registration with the NULL SUCI is successful in the terminal;

based on determining that the SA registration with the NULL SUCI is successful, adding SA registration with the NULL SUCI to an allowed list of the PLMN to enable the SA capability with the NULL SUCI in a database maintained by the terminal; and based on determining that the SA registration with the NULL SUCI is unsuccessful, starting a predefined timer at a configurable interval in the terminal to enable SA registration with the NULL SUCI in the terminal.

8. The method of claim 4, wherein the mapped GUTI is associated with an identifier of the terminal.

9. The method of claim 8, wherein the identifier of the terminal is a permanent equipment identifier (PEI).

10. The method of claim 2, wherein the USIM is an application performed by the SIM card.

11. The method of claim 4, wherein the SUCI is based on a subscription permanent identifier (SUPI).

12. The method of claim 7, wherein the NULL SUCI is based on an unconcealed SUPI.

13. The method of claim 6, further comprising sending, after the enabling the SA capability, an encrypted subscription permanent identifier (SUPI) to the network in the form of a subscription concealed identifier (SUCI).

14. A terminal comprising:

a memory;

a communicator;

a processor operatively coupled to the memory and the communicator; and a standalone access (SA) capability management controller operatively coupled to the memory, the processor and the communicator, the SA capability management controller configured to:

detect whether a subscriber identity module (SIM) card is available in the terminal;

determine whether the SIM card supports a subscription concealed identifier (SUCI) calculation service;

if the SIM card supports the SUCI calculation service, enable the SA capability in the terminal; and if the SIM card does not support the SUCI calculation service, disable the SA capability in the terminal.

15. The terminal of claim 14, wherein the SA capability management controller is further configured to:

based on the SIM card being detected, determine whether the SIM card supports a subscription identifier privacy support service;

based on determining that the SIM card supports the subscription identifier privacy support service:

determine SA support for the terminal, and enable the SA capability in the terminal; and based on the SIM card not supporting the subscription identifier privacy support service, disable the SA capability in the terminal.

16. The terminal of claim 15, wherein the SA capability management controller is further configured to, based on a capability of the SIM card changing:

enable the SA capability in the terminal based on the capability of the SIM card changing to support at least of the subscription identifier privacy support service and the SUCI calculation service; and disable the SA capability in the terminal based on the capability of the SIM card changing to not support at least one of the subscription identifier privacy support service and the SUCI calculation service.

17. The terminal of claim 15, wherein the SA capability management controller is further configured to enable the SA capability by:

adding the SA capability to a radio access technology (RAT) priority list, wherein the terminal is configured to prioritize an SA RAT over a plurality of RATs; and moving the terminal to an SA network using the GUTI or a SUCI.

18. The terminal of claim 15, wherein the SA capability management controller is further configured to disable the SA capability in the terminal by:

blocking the SA capability in the terminal;

removing the SA capability from a radio access technology (RAT) priority list; and wherein the terminal is further configured to:

scan for an alternate RAT over a plurality of RATs, and camp on the alternate RAT until the SIM card supports at least one of the subscription identifier privacy support service and the SUCI calculation service.

19. The terminal of claim 18, wherein the terminal is further configured to, after scanning for the alternate RAT over the plurality of RATs and camping on the alternate RAT:

acquire a network on the alternate RAT; and update the SIM card with respect to the network on the alternate RAT using a SIM over-the-air (OTA) procedure to enable the SA capability in the terminal.

20. The terminal of claim 15, wherein the terminal is further configured to:

determine that a NULL SUCI is allowed in a public land mobile network (PLMN) based on data maintained by the terminal, wherein the PLMN is a current PLMN;

enable the SA capability in the terminal based on the NULL SUCI being allowed in the PLMN based on the data maintained by the terminal;

determine whether SA registration with the NULL SUCI is successful in the terminal;

based on determining that the SA registration with the NULL SUCI is successful, add SA registration with the NULL SUCI to an allowed list of PLMNs to enable the SA capability with the NULL SUCI in a database maintained by the terminal; and based on determining that the SA registration with the NULL SUCI is unsuccessful, start a predefined timer at a configurable interval in the terminal to enable SA registration with the NULL SUCI in the terminal.

* * * * *